G. W. Smith,
Ice Pitcher.
Nº 20,592. Patented June 15, 1858.

UNITED STATES PATENT OFFICE.

GEO. W. SMITH, OF HARTFORD, CONNECTICUT.

ICE-PITCHER.

Specification of Letters Patent No. 20,592, dated June 15, 1858.

*To all whom it may concern:*

Be it known that I, GEORGE W. SMITH, of the city and county of Hartford and State of Connecticut, have invented a new and useful Improvement in Ice-Pitchers; and I do hereby declare that the following is a full, clear, and exact description of the same, reference being had to the annexed drawings, making part of this specification.

Figure 1:
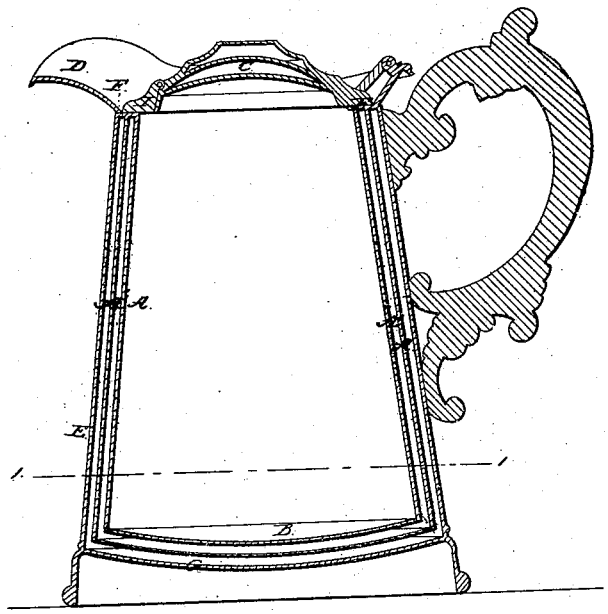
Figure 2:
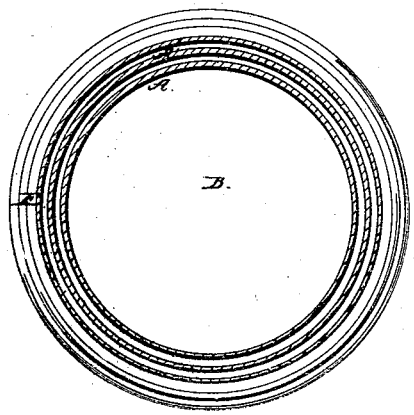

Figure 1, is a vertical section through the center of an ice pitcher constructed after the improved plan. Fig. 2, is a horizontal section of ditto at the line 1, 1, of Fig. 1.

Similar letters in the figures refer to corresponding parts.

The nature of this invention and improvement consists, in surrounding the ordinary double walled pitcher or other vessel for holding liquids, with an additional shell or wall, arranged concentrically therewith, and arranging above the double bottom and top of the same corresponding additional disks, in such a manner as to interpose an additional air space to the entrance of the external heat, and thus to more thoroughly preserve the temperature of the contents of the pitcher, and at the same time keep the exterior shell or wall at such a relative degree of temperature with the exterior atmosphere, as shall prevent its condensation on the outer surface, and the consequent dripping thereby occasioned.

To enable others skilled in the art to make and use my invention, I will proceed to more fully describe its construction and characteristics.

The double walled pitcher is formed of two concentric shells A, A', curved or contracted and bulged outward as they extend upward, to correspond with any desired model or design, or made straight as represented in the drawing, and provided with a double bottom B, and cover C, and flared outward at one side to form the usual conducting lip or spout D. Outside the shell A', is placed another concentric shell E, exactly corresponding in form with the shell A', and situated the same distance therefrom as it does from the inner shell A, and being secured in its position by being soldered or fused at its upper edge to the horizontal rim F, connecting the three shells together, and at its lower edge to an additional disk or circular plate G, below the bottom of the double walled portion, and the same distance from the same, as the concentric shells A', and E are apart. The exterior surface of this outer shell E, may be ornamented with such alto rilievo or basso rilievo designs, as the taste of the constructor may dictate, and the pitcher thus formed is provided with a suitable handle on its sides, and an angular and flared flange on its upper part, to which is hinged a triple shell cover C, provided with a small hinged door or lip I, next the conductor or spout J, for allowing the passage of the water through the same, when the pitcher is tilted or "cock billed" for this purpose.

The advantages of thus inclosing a double walled ice pitcher within an additional shell and air space, are obvious. It is a well known fact, that the outer surface of a vessel containing water or other liquid of a much colder temperature than the atmosphere surrounding it, produces a constant condensation of the air directly in contact with it, and from this cause, not only renders the vessel disagreeable to handle, but also causes a constant dripping of the water thus accumulated on said surface, on to the table or other place upon which the pitcher is placed. This defect is entirely remedied by constructing the pitcher with the additional shell E; for, while a colder body of air is always kept in contact with the outer shell A' of the double pitcher, than would otherwise be, if the air of the temperature of the room were in direct contact, and the water or other liquid is thereby protected in an increased degree from the external heat, the air between the double pitcher and outer shell E, is not cold enough to produce any condensation of the air on the outer surface of said shell. In the event moreover of the outer shell becoming battered, from carelessness in handling or other cause, the irregularity will be confined to the outer air space, and will not affect the inner one between the shells A, A', this outer additional shell forming, in fact a protection and barrier to the inner one A', and against the contact of the warmer external air to the surface of the same.

It has been ascertained by actual experiment, that a pitcher constructed after this improved plan, will preserve a certain quantity of ice and water in a cool state, one third longer than the same quantity of ice and water would be kept at the same temperature, in a double walled pitcher.

I am aware that vessels have been constructed with a double wall, for the purpose of preserving their contents from the exterior heat, and therefore I do not claim this device. But—

What I do claim as new and desire to secure by Letters Patent, is,

Surrounding double wall pitchers with an additional concentric shell E, and their double bottoms and covers with corresponding additional disks G, C', for the purpose of protecting the same from being battered through carelessness in handling or other cause, and preserving them from the direct contact of external heat, and thus keeping a colder body of air in contact with them, of such temperature as shall not only more thoroughly preserve the cold temperature of the ice and water contained in the said pitchers, but also prevent the condensation of the air on the exterior surfaces of the same, and the consequent dripping of the water thus accumulated, therefrom, substantially in the manner herein set forth.

GEO. W. SMITH.

Witnesses:
J. W. COOMBS,
MICH. HUGHES.